Patented July 22, 1947

2,424,424

UNITED STATES PATENT OFFICE 2,424,424

POLYALCOHOLS CARRYING ETHER LINKAGES AND PROCESS FOR PREPARING THE SAME

Howard C. Woodruff, New York, N. Y.

No Drawing. Application July 29, 1944, Serial No. 547,295

4 Claims. (Cl. 260—97)

This invention relates to polyalcohol carrying ether linkages and ester groups and processes of producing and using the same.

It is herein illustrated as a continuation in part of my Ser. No. 444,999½, filed May 29, 1942.

Some of the products of my invention are particularly adapted for use as raw materials for ester resins, and esterification reactions in general.

My polyalcohols can be utilized to form the basis of ester resins and ester oils which contain a plurality of ether linkages in very large molecules.

These molecules being more diverse in stearic arrangement due to the interspersed oxygen ether linkages form much more flexible and distensible coating compounds and therefore have greater durability and higher viscosity than other coating materials heretofore produced.

I have found that esters of my polyalcohols herein described are particularly resistant and flexible and are therefore admirably suited for exterior marine finishes, navy deck paints, and other uses where the desirable combination of hardness, distensibility, toughness, and adhesion are required.

The present invention may be regarded for many purposes as based on the discovery that compounds such as condensed polyalcohols carry an ether group that is highly reactive when certain of the hydroxyl groups are converted to ester groups.

This reaction provides a cheap and commercial advantageous method of making my new alcohols by the reaction of the ether group with hydroxyl groups of an alcohol containing three or more hydroxyl groups by means of the elimination of water and the substituting of two ether oxygens, in place of the original ether group.

Moreover the yield of product by this method approaches to within ½% of that theoretically possible.

The products may be liquid or highly viscous liquids or resinous according to the material used.

Other objects and advantages will hereinafter appear.

Example 1

1000 parts WW wood rosin and 135 parts C. P. glycerine heated under reflux at 550° F. until clear in toluol.

This produced an ester of the glycerine in which two hydroxyls of each glycerine were esterified with the rosin acids, and left unchanged a single hydroxyl.

Two moles of this hydroxyl bearing ester then combined with the loss of water and remained attached to each other, and thus produced a resulting oxygen linkage.

This is an ether-containing ester. Analysis showed it contained no free hydroxyl groups.

Example 2

1000 parts of ether-containing rosin ester produced as in Example 1 and 50 parts of pentaerythritol were heated to 570° F. for 5 minutes after which no further water was eliminated.

The highly reactive oxygen in the ether linkage of the ether-containing ester united with two hydrogens contained in separate hydroxyls of the pentaerythritol thereby eliminating water, and the oxygens of each hydroxyl group replaced the eliminated oxygen and thereby unite the pentaerythritol nucleus by two ether linkages to the rosin acid ester.

The remaining two hydroxyls of the pentaerythritol remain unchanged and give the product its desirable alcoholic character.

The final product produced is a dihydric alcohol which contains ester-groups attached through ether oxygen linkages to a pentaerythritol nucleus.

The pentaerythritol nucleus with its quaternary carbon atom and four radiating $CH_2$ groups remains unchanged in the reaction.

Materials of widely divergent characteristic may be produced in the above procedure by substituting:

1. Other acidic materials for the rosin employed, such as soya oil fatty acids, dehydrated castor oil-fatty acids, fused Congo gum, hydrogenated rosin, maleic anhydride-treated rosin, phenol formaldehyde-treated rosin.

2. Other polyalcohols for the pentaerythritol employed, such as any alcohol which contains more than three hydroxyl groups, namely dipentaerythritol, sorbitol, mannitol, erythritol, inositol, polyallyl alcohol.

3. Substitution of many other polyalcohols for the glycerine in Example 1.

I have found that two molecules of an ester of a polyalcohol containing more than three hydroxyl groups, in which one hydroxyl group remains unesterified, and in which the ester groups are terpenic resinous acid radicals or oleaginous acid radicals, or certain dibasic acids, when heated to 550–570° F., unite, with the elimination of water to form an ether in which the two moles are joined together into one by means of an oxygen linkage.

In general the esters of oleaginous acids produce liquids, the resin acids produce resinous products, and certain dibasic acids such as maleic acid or its anhydride produce viscous thermoplastic resins.

As an example of such a substitution pentaerythritol may be used as follows:

Example 3

1000 parts of WW wood rosin and 140 parts of pentaerythritol were heated under reflux at 550–570° F. until clear in toluol. This produced an ester of pentaerythritol in which three hydroxyls of each pentaerythritol were esterified with rosin acids and a single hydroxyl remained. Two moles of this hydroxyl-bearing ester then combined with the loss of water and remained attached to each other through the resulting ether oxygen linkage.

This is an ether containing ester. Analysis showed it contained no hydroxyl groups.

Example 4

1000 parts ether-containing rosin ester produced in Example 3 and 50 parts pentaerythritol were heated to 570° F. for 5 minutes when no further water was eliminated. The highly reactive ether oxygen in the product of Example 3 reacted with two hydroxyls of the added pentaerythritol to form water and the two oxygens remaining from the hydroxyl groups united the pentaerythritol nucleus to two rosin ester radicals thus forming a dihydric di-ether rosin ester.

The alcohols obtained as a product in the various forms of my invention neutralize practically any organic acid, resinous or otherwise, with the result that high molecular weight esters are produced.

This is especially useful in yielding new resins with special properties when, for example, my new alcohols are used to neutralize phthalic anhydride, maleic, anhydride, fumaric acid, salicylic acid, lactic acid, and oleaginous acids, such as stearic acid, linseed oil fatty acids, naphthenic acids, and other types of acid such as acrylic acid.

It will be noted that Example 3 is an ether, a sub-combination intermediate product useful in making the product of Example 4.

Having thus described in some detail certain embodiments of my invention, what I claim is:

1. The process of producing a new alcohol which consists in reacting one thousand parts of rosin with one hundred and thirty five parts of glycerine at 550° F. until no free hydroxyl groups remain, and thereafter reacting one thousand parts of this product with 50 parts of pentaerythritol at 570° F. until no more water is eliminated.

2. A new alcohol consisting of a pentaerythritol nucleus, two carbons of which carry unchanged hydroxyls, and two carbons being linked through oxygen to two glycerine nuclei the remaining carbons of which carry ester groups consisting of the acid nucleus of maleic-anhydride-modified-rosin.

3. A new alcohol consisting of a pentaerythritol nucleus, two carbons of which carry unchanged hydroxyls, and two carbons being linked through oxygen to two glycerine nuclei the remaining carbons of which carry ester groups consisting of the acid nucleus of phenol-formaldehyde-modified rosin.

4. An alcohol consisting of the nucleus of a polyhydric alcohol containing more than three hydroxyl groups carrying at least two hydroxyl groups united through oxygen linkage to two polyhydric alcohol nuclei containing more than three carbon atoms which are different in identity from the alcohol nucleus to which they are attached, the remaining hydroxyl positions of said two polyhydric alcohol nuclei carrying ester groups consisting of acid radicals containing between eighteen and twenty-two carbon atoms and also containing at least one carbon to carbon unsaturated linkage.

HOWARD C. WOODRUFF.

REFERENCES CITED

The following references are of record in the file of this patent:

UNITED STATES PATENTS

| Number | Name | Date |
|---|---|---|
| 2,275,494 | Bennett | Mar. 10, 1942 |
| Re. 21,322 | Harris | Jan. 16, 1940 |

OTHER REFERENCES

Woodruff, Official Digest of Fed. of Paint and Varnish Production, Oct. 1940, pp. 397–405.